United States Patent [19]

Mattsson et al.

[11] Patent Number: 5,735,162
[45] Date of Patent: Apr. 7, 1998

[54] FOLDING DEVICE

[75] Inventors: Mikael Mattsson, Mörrum; Bo Johansson, Olofström, both of Sweden

[73] Assignee: AB Volvo, Gothenburg, Sweden

[21] Appl. No.: 732,373

[22] PCT Filed: May 18, 1995

[86] PCT No.: PCT/SE95/00565

§ 371 Date: Nov. 1, 1996

§ 102(e) Date: Nov. 1, 1996

[87] PCT Pub. No.: WO95/32064

PCT Pub. Date: Nov. 30, 1995

[30] Foreign Application Priority Data

May 19, 1994 [SE] Sweden ................ 9401740

[51] Int. Cl.⁶ .................................. B21D 39/02
[52] U.S. Cl. ................ 72/315; 72/451; 29/243.58
[58] Field of Search ............. 72/312–315, 450, 72/451; 29/243.58

[56] References Cited

U.S. PATENT DOCUMENTS

| 468,462 | 2/1892 | Kinnear ................ 72/314 |
| 2,310,556 | 2/1943 | Strong. | |
| 3,058,512 | 10/1962 | Chebuhar ................ 72/312 |
| 4,347,754 | 9/1982 | Wehler. | |

FOREIGN PATENT DOCUMENTS

| 1155414 | 10/1963 | Germany. | |
| 1215639 | 5/1966 | Germany. | |
| 216818 | 9/1986 | Japan ................ 72/315 |
| 222638 | 10/1986 | Japan ................ 72/313 |
| 34222 | 2/1990 | Japan ................ 72/314 |
| 2006313 | 1/1994 | U.S.S.R. ................ 72/312 |
| 1075663 | 7/1967 | United Kingdom. | |
| WO89/09101 | 10/1989 | WIPO. | |

*Primary Examiner*—Daniel C. Crane
*Attorney, Agent, or Firm*—Young & Thompson

[57] ABSTRACT

The invention relates to a clinching press comprising a press tool (52) and a prebending unit (1) to produce a reciprocating movement in a tool holder (14) of a prebending tool (12), said tool holder being articulated to a foundation (2). The prebending unit (1) has a pressure rod (50) coupled to the press tool (52) and a knee-joint mechanism (28, 30), joined, on the one hand, to a pivot point (36) on the tool holder (14) and, on the other hand, to a fixed pivot point (34) on the foundation (2). The pressure roller (46) is freely rotatably mounted at the connecting point (32) of the links (28, 30). The knee-joint mechanism (28, 30) has a gas pressure spring (38, 42) for returning the mechanism to the starting position shown. The knee-joint mechanism (28, 30) can be moved under the influence of the pressure rod (50), in a continuous movement from the bent-out in the position shown to a position bent-out in the opposite direction, the tool holder (14) being displaceable along a predetermined path of movement between a starting position, a work position and an end position.

18 Claims, 2 Drawing Sheets

FOLDING DEVICE

This application is a 371 of PCT/SE95/00565, filed May 18, 1995.

BACKGROUND OF THE INVENTION

1. Field of the Invention

The invention relates to a clinching press, comprising a press tool and a prebending unit for producing a reciprocal movement of a tool holder pivotally joined to a foundation, said tool holder being supported in such a manner that it is displaceable by means of an operating device coupled to a drive means, along a predetermined path of movement between a starting position, a work position and an end position.

2. Description of the Related Art

Bending units of the above mentioned type are well known in a number of different configurations and they are used to prebend a margin of one sheet metal panel around the margin of another sheet metal panel, whereupon the final clinching is carried out separately to provide a seam or welt joining the two panels to each other. Operations of this type are common in the auto industry, for example when manufacturing doors, engine hoods and similar body parts. Conventionally, a bending unit of this type is actuated by an hydraulically operated cam disc engaging a cam roller on a pivotally mounted tool holder, the extension and retraction of the piston rod of the hydraulic cylinder acting on the tool holder via the cam disc arrangement, to impart the desired movement to the tool and produce the required force to enable the tool to carry out the desired bending operation.

By virtue of the cam disc arrangement, extension of the piston rod of the cylinder to its completely extended position and retraction of the same does not automatically return the tool holder. Rather, a spring intended for this purpose returns the tool holder to its starting position spaced from the panels.

One disadvantage of a prebending unit operated in this manner is that the cam disc arrangement generates horizontal forces, which, via the piston rod, are transmitted to the hydraulic cylinder and can disrupt its operation, and therefore special guide means are required to relieve the hydraulic cylinder.

An additional disadvantage of a more serious type is that the return spring of the tool holder can break and the tool will then remain on the workpiece during the subsequent final clinching step, which may result in damage to both the tools and the workpiece bed. Such damage can be costly to repair and disrupts production.

SUMMARY OF THE INVENTION

The purpose of the present invention is therefore to provide a device in a prebending unit of the type described by way of introduction which guarantees the required return of the tool holder and only generates vertical forces on the drive system, as well as being of simple construction and reliable function. This is achieved according to the invention by a device of the type by way of introduction which is characterized in that the operating device has an operating means which is coupled to the movement of the press tool and a knee-joint mechanism, which, in the form of two articulated lengths, is joined, on the one hand, to a pivot point on the tool holder, and, on the other hand, to a stationary pivot point in the foundation, in that the knee-joint mechanism, under the influence of the operating means, can be moved in a continuous movement from a bent-out position when the tool holder is in its starting position, to a completely extended position when the tool holder is in its work position, in that the knee-joint mechanism can be bent-out once again in the opposite direction to assume a bent-out position when the tool holder is in its end position, and in that the knee-joint mechanism is coupled to a return means supported in the foundation, for returning the tool holder to its starting position.

BRIEF DESCRIPTION OF THE DRAWINGS

The invention will be described in more detail below with reference to the accompanying schematic drawings, which show one embodiment of the invention and in which.

DESCRIPTION OF THE PREFERRED EMBODIMENT

Figure 1:
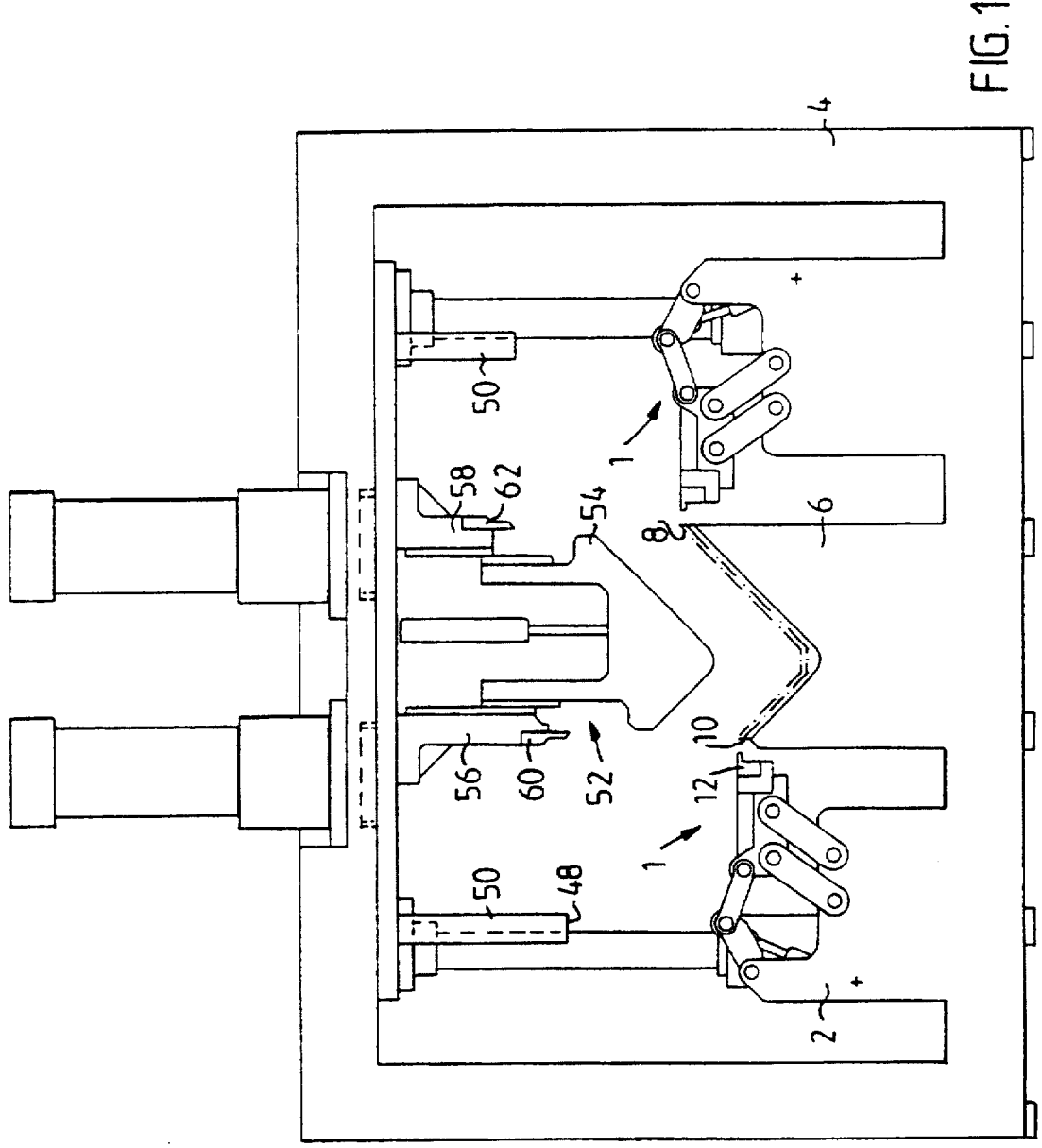
FIG. 1 is an overall sideview of a machine in which two prebending units according to the invention are used, each unit being shown in its starting position.

The prebending unit 1 shown in the drawings is constructed of a foundation 2, which is fixed to a stand 4, supporting a counter-surface 6 for a workpiece 8 with a margin 10, which is to be bent in a first step towards the major portion of the workpiece 8 with the aid of a prebending tool 12. The tool 12 is supported by a tool holder 14, which is carried in turn by a linkage system with two links 16 and 18. The link 16 is articulated at pivot points 20 and 22 to the foundation 2 and the tool holder 14, respectively, and the link 18 is articulated at pivot points 24 and 26, respectively, to the foundation 2 and the tool holder 14, respectively. The pivot points 20–26 are in practice pins about which the components pivot.

Figure 2:
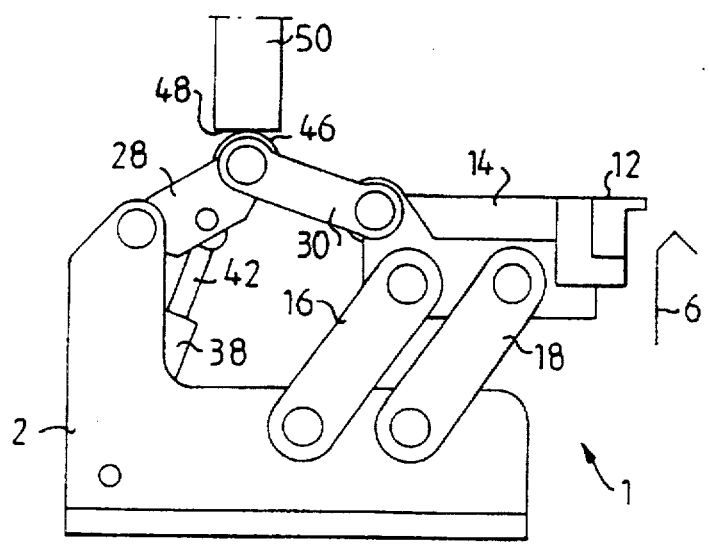
FIG. 2 is a sideview of the lefthand prebending unit according to FIG. 1 on a larger scale, also shown in its starting position.
Figure 3:
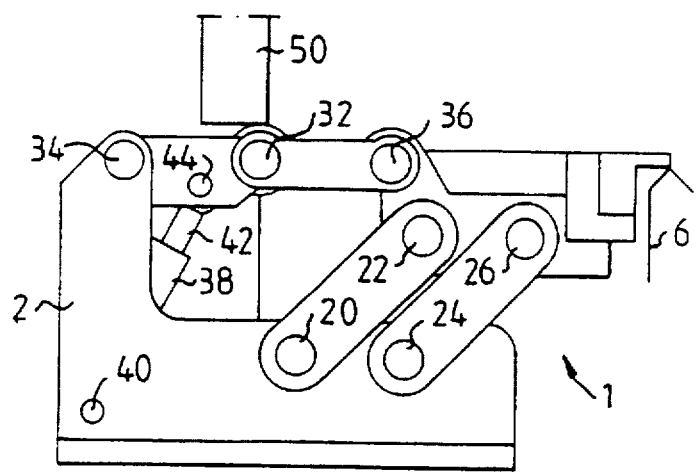
FIG. 3 is a sideview corresponding to FIG. 2, but with the prebending unit shown in a work position.
Figure 4:
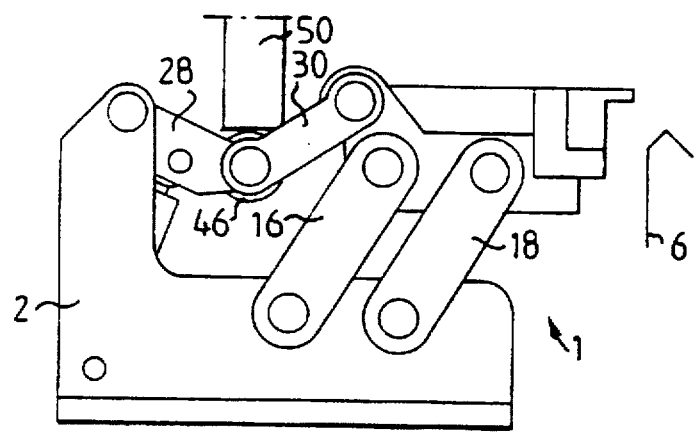
FIG. 4 is a sideview corresponding to FIG. 2, but with the prebending unit shown in a final position after completed bending operation.

The links 16 and 18 form together with the foundation 2 and the tool holder 14 a parallellogram linkage system, which makes it possible to displace the tool holder 14 and the tool 12 relative to the foundation 2 and the counter-surface 6 in such a manner that the tool 12 can be displaced from the starting position shown in FIG. 2 to the work position shown in FIG. 3, and then to the final position shown in FIG. 4.

As can be seen in the drawings, the links 16 and 18 are the same length, which means that the tool 12 will always be oriented parallel to the workpiece and will follow an arcuate path from the starting position to the operating position, coinciding with the corresponding path of movement from the work position to the final position. This movement is controlled by the knee-joint mechanism 28,30 with two links 28,30 pivotally joined to each other at a pivot point 32.

The link 28 is joined at its free end at a pivot point 34 to the foundation 2, and the link 30 is joined at its free end at a pivot point 36 to the tool holder 14. A gas compression spring 38 is articulated to the foundation 2 an a pivot point 40 and has a piston rod 42, the free end of which is articulated at a pivot point 44 to the link 28. The pivot points 32–36, 40 and 44 are in practice pins, about which the components pivot. A pressure roller 46 is freely rotatably journalled on the pin 32 and is acted on by a flat surface 48 on a pressure rod 50 of adjustable length. In certain cases, as circumstances require, it may be suitable to fix a flat pressure plate (not shown) onto the free end of the pressure rod 50 to assure that said end of the pressure rod will be retained on the pressure roller 46 when the knee-joint mechanism 28,30 shifts between the bent positions and the completely extended position. During this movement, the pressure roller moves a short distance away from the pivot point 34 in the transverse direction of the pressure rod, as can be seen in FIGS. 2–4.

By virtue of the fact that the pressure rod 50 is of adjustable length, e.g. by screw means or the like, or can be replaced by a rod of desired length, adjustment of the sequential steps of the machine is facilitated during rigging or during replacement of the bending tool and/or counter-surface for working different workpieces.

For driving the tool 12 and the tool holder 14 along the predetermined path of movement, the pressure rod 50 is coupled to a hydraulically driven press tool 52, also supported by the stand 4, with a stamp 54 and two tool holders 56 and 58, respectively, each having a final bending tool 60 and 62, respectively.

The device described above functions as follows:

FIG. 1 shows the machine in its starting position with the tool holder 14 and the tool 12 at their greatest distance from the workpiece 8 on the counter-surface 6. During operation of the machine, the hydraulic press tool 52 and each pressure rod 50 are displaced in a synchronized movement towards the counter-surface 6 with the workpiece 8 and the respective prebending units 1, so that the stamp 54 is pressed against the workpiece 8 on the counter-surface 6. As the movement continues, the flat end 48 of each pressure rod 50 will come into contact with the associated pressure roller 46 on each prebending unit 1, as is shown in FIG. 2. The tool holder 14 with the prebending tool 12 will in this case still be at its starting position. As the pressure rod 50 continues its movement, by cooperation between the flat end 48 and the pressure roller 46, the knee-joint mechanism 28,30 will be moved to its entirely extended position shown in FIG. 3. During this step, the pressure roller 46, by rolling against the flat end 48, will be displaced a short distance from the centerline of the pressure rod at the same time as the pivot point 32 is displaced the same distance from the fixed pivot point 34 in the horizontal direction. The link 30 displaces the pivot point 36 and the tool holder 14 a corresponding distance.

By virtue of the fact that the tool holder 14 is a portion of the parallellogram linkage system, which, in addition to the tool holder, comprises the links 16 and 18 and the foundation 2, the tool 12 held securely in the tool holder will follow an arcuate path to the position shown in FIG. 3. In this position, the knee-joint mechanism 28,30 is entirely extended and transmits a very large force from the fixed pivot point 32 in the foundation to the tool 12 held in the tool holder 14. The pivot points 34, 32 and 36 are in this case essentially in alignment with each other.

As the movement of the pressure rod 50 continues, the knee-joint mechanism 28,30 is bent out in the opposite direction as the pressure roller 46 is displaced towards the pivot point 34 in the transverse direction of the pressure rod to again become centered along the central axis of the pressure rod. The distance between the pivot points 34 and 36 of the links 28 and 30 is thus shortened a corresponding amount and the movement of the pivot point 36 of the link 30, in cooperation with the links 16 and 18 will move the tool 12 along the arcuate path to the final position shown in FIG. 4.

The other worksteps of the machine are synchronized with the bending out movement of the link mechanism 28,30 and upon completed operation, the knee-joint mechanism 28,30 will be in its bent-out position shown in FIG. 4, and the tool 12 will be retracted from the counter-surface 6.

When the press tool 52 together with the two pressure rods 50 is returned to the starting position for a new workcycle, the knee-joint mechanism 28,30 is returned to the starting position shown in FIG. 2 by means of the gas spring 38,42. If, for some reason, this gas spring should not function, the knee-joint mechanism 28,30 will remain in the bent-out position shown in FIG. 4. If, in this situation, a new workcycle were carried out by the press tool 52, there would be no risk of the prebending tool 12 colliding with the final bending tool 60 at the counter-surface 6. This is guaranteed i.a. by the fact that the tool 12 cannot be unintentionally displaced from the final position shown in FIG. 4, since the pressure rod 50 will once again hold the knee-joint mechanism 28,30 in its bent-out position when the final bending tool 60 is in contact with the workpiece 8 on the counter-surface 6.

It is finally pointed out that the device according to FIGS. 2–4 is symmetrically arranged with the pressure rod 50, the pressure roller 46 and the foundation 2 arranged centrally. The entire linkage system is doubled, i.e. an identical linkage system is disposed on either side of the foundation 2 and the pressure roller 46. This is true with the exception of the link 28, the tool holder 14 and the gas spring 38,42, of which there are only one each and which are centrally placed. Otherwise, the entire movement mechanism is doubled, thus avoiding uneven loads and providing a more stable system.

The invention is of course not limited to the embodiment described above. Rather, changes can be made within the scope of the following claims. It is thus possible to use, instead of the parallellogram system with two parallel links, a system where one link is eliminated and the other link is integral with the tool holder. When the knee-joint is operated, the tool held in the tool holder will make a rocking movement about the pivot point of the other link in the foundation.

We claim:

1. Clinching press comprising a press tool (52) and a pre-bending unit (1) for producing a reciprocal movement of a tool holder (14) pivotally joined to a foundation (2), said tool holder being supported in such a manner that it is displaceable, through motion of an operating means (50) coupled to the press tool (52), along a predetermined path of movement between a starting position, a work position and an end position, and the tool holder (14) being provided with a return means (38, 42) for returning the tool holder (14) to its starting position, and a knee-joint mechanism (28, 30), which, in the form of two articulated lengths, is joined, at one end, to a pivot point (36) on the tool holder (14), and, on the other hand, to a stationary pivot point (34) in the foundation, wherein the knee-joint mechanism (28, 30), under influence of the operating means (50), can be moved in a continuous movement from a first bent-out position where the tool holder (14) is in its starting position, via a completely extended position where the tool holder (14) is in its work position, to a second bent-out position where the tool holder (14) is in its end position, and the returning means (38, 42) being arranged to return the knee-joint mechanism (28, 30) and the tool holder (14) in a reversed continuous movement from the second bent-out position, via the completely extended position to the first bent-out position, where the tool holder (14) once again takes its starting position.

2. Device according to claim 1, wherein, when the knee-joint mechanism (28, 30) is in one of its bent-out positions, a prebending tool (12) mounted in the tool holder (14) will be off-set a predetermined distance from a path of a final bending tool (60) arranged in the press tool (52).

3. Device according to claim 1, wherein the operating means is in the form of a pressure rod (50), a free end of which (48) can be pressed against a freely rotatable roller (46) which is journalled at the point of connection (32) between the articulated lengths (28, 30).

4. Device according to claim 3, wherein the free end (48) of the pressure rod (50) is flat and the pressure rod is of adjustable length.

5. Device according to claim 1, wherein the tool holder (14) is supported by two links (16, 18), which are journalled in pivot points (20, 24) in the foundation (2), and in pivot points (22, 26) in the tool holder (14).

6. Device according to claim 5, wherein the links (16, 18) are of equal length.

7. Device according to claim 1, wherein the return means (38, 42) consists of a gas spring, connected to a pivot point (40) positioned off-set of an assumed line through pivot points (34, 36) at ends of the knee-joint mechanism (28, 30) in the completely extended position.

8. Device according to claim 3, wherein the free end (48) of the pressure rod (50) supports a flat pressure plate.

9. Clinching press comprising a foundation (2);

a press tool (52);

a tool displacement means (50) coupled to the press tool (52); and at least one pre-bending unit (1), the pre-bending unit comprising:

a tool holder (14) which is reciprocally attached to the foundation (2) to allow movement along a predetermined path;

a knee-joint mechanism (28, 30) connecting the tool holder (14) to the foundation (2); and a return means (38, 42) which urges the knee-joint mechanism (28, 30) into a first bent position with the tool holder (14) in a starting position; wherein displacement of the press tool (52) toward a work piece (8) moves the tool displacement means (50) into contact with the knee-joint mechanism (28, 30) in the first bent position while the tool holder (14) is in the starting position;

further displacement of the tool displacement means (50) moves the knee-joint mechanism (28, 30) into a fully extended position, moving the tool holder (14) to an end of the predetermined path into a work position;

still further displacement of the tool displacement means (50) moves the knee-joint mechanism (28, 30) beyond the fully extended position into a second bent position on a side of the fully extended position opposite that of the first bent position, thereby moving the tool holder (14) back along the predetermined path away from the end position; and retraction of the tool displacement means (50) allows the return means (38, 42) to move the knee-joint mechanism (28, 30) back through the fully extended position to the first bent position, which correspondingly moves the tool holder (14) through the work position to the starting position.

10. The clinching press of claim 9, further comprising two links (16, 18) connecting the tool holder (14) to the foundation (2), each of the links having a first end pivotally attached to the foundation (2) and a second end pivotally attached to the tool holder (14).

11. The clinching press of claim 10, wherein the links (16, 18) are of equal length.

12. The clinching press of claim 9, wherein the return means (38, 42) is pivotally attached at a first end to the foundation (2) and at a second end to the knee-joint mechanism (28, 30).

13. The clinching press of claim 12, wherein the return means comprises a gas spring.

14. The clinching press of claim 9, wherein the displacement means (50) comprises a pressure rod, a free end of which contacts a roller (46) disposed at a knee joint (32) of the knee-joint mechanism (28, 30).

15. The clinching press of claim 14, wherein the pressure rod is of adjustable length.

16. The clinching press of claim 9, wherein the knee-joint mechanism (28, 30), when positioned at either the first bent position or the second bent position, places a prebending tool (12) mounted in the tool holder (14) at least a predetermined minimum clearance distance from a final bending tool (60 62) disposed on the press tool (52).

17. The clinching press of claim 9, wherein two prebending units are disposed on the foundation (2) on opposite sides of the press tool (52).

18. Clinching press comprising a foundation (2);

a press tool (52);

a pressure rod (50) coupled to the press tool (52); and at least one pre-bending unit (1), the pre-bending unit comprising:

a tool holder (14) which is reciprocally attached to the foundation (2) by two pivotally attached links of equal length to allow movement of the tool holder (14) along a predetermined, arcuate path;

a knee-joint mechanism (28, 30) connecting the tool holder (14) to the foundation (2); and a return means (38, 42) comprising a gas spring pivotally attached at a first end to the foundation (2) and at a second end to the knee-joint mechanism (28, 30), the return means urging the knee-joint mechanism (28, 30) into a first bent position with the tool holder (14) in a starting position; wherein displacement of the press tool (52) toward a work piece (8) moves the pressure rod (50) into contact with the knee-joint mechanism (28, 30) in the first bent position while the tool holder (14) is in the starting position;

further displacement of the pressure rod (50) moves the knee-joint mechanism (28, 30) into a fully extended position, moving the tool holder (14) to an end of the predetermined path into a work position;

still further displacement of the pressure rod (50) moves the knee-joint mechanism (28, 30) beyond the fully extended position into a second bent position on a side of the fully extended position opposite that of the first bent position, thereby moving the tool holder (14) back along the predetermined path away from the end position; and retraction of the pressure rod (50) allows the return means (38, 42) to move the knee-joint mechanism (28, 30) back through the fully extended position to the first bent position, which correspondingly moves the tool holder (14) through the work position to the starting position.

\* \* \* \* \*